P. & F. ROLANDO.
CHANGING SPEED TRANSMISSION DEVICE.
APPLICATION FILED JULY 25, 1910.

1,040,763.

Patented Oct. 8, 1912.

2 SHEETS—SHEET 1.

P. & F. ROLANDO.
CHANGING SPEED TRANSMISSION DEVICE.
APPLICATION FILED JULY 25, 1910.
1,040,763.
Patented Oct. 8, 1912.
2 SHEETS—SHEET 2.
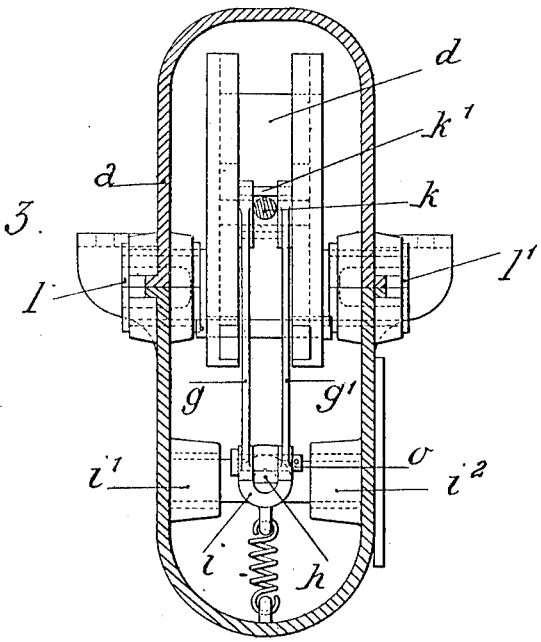

UNITED STATES PATENT OFFICE.

PAUL ROLANDO AND FRANÇOIS ROLANDO, OF PARIS, FRANCE.

CHANGING-SPEED-TRANSMISSION DEVICE.

1,040,763.  Specification of Letters Patent.  Patented Oct. 8, 1912.

Application filed July 25, 1910. Serial No. 573,756.

*To all whom it may concern:*

Be it known that we, PAUL ROLANDO and FRANÇOIS ROLANDO, both citizens of the Republic of France, and residing in Paris, France, have invented new and useful Improvements in Changing-Speed-Transmission Devices, of which the following is a specification.

The apparatus which forms the subject of the present invention avoids the use of toothed wheels and provides an unlimited number of speeds which may be increased or decreased progressively without any jerks and which is brought into and out of gear instantaneously by the treadle used for varying the speed. Such apparatus dispenses with all the differential gears when applied to motor vehicles.

Figure 1:
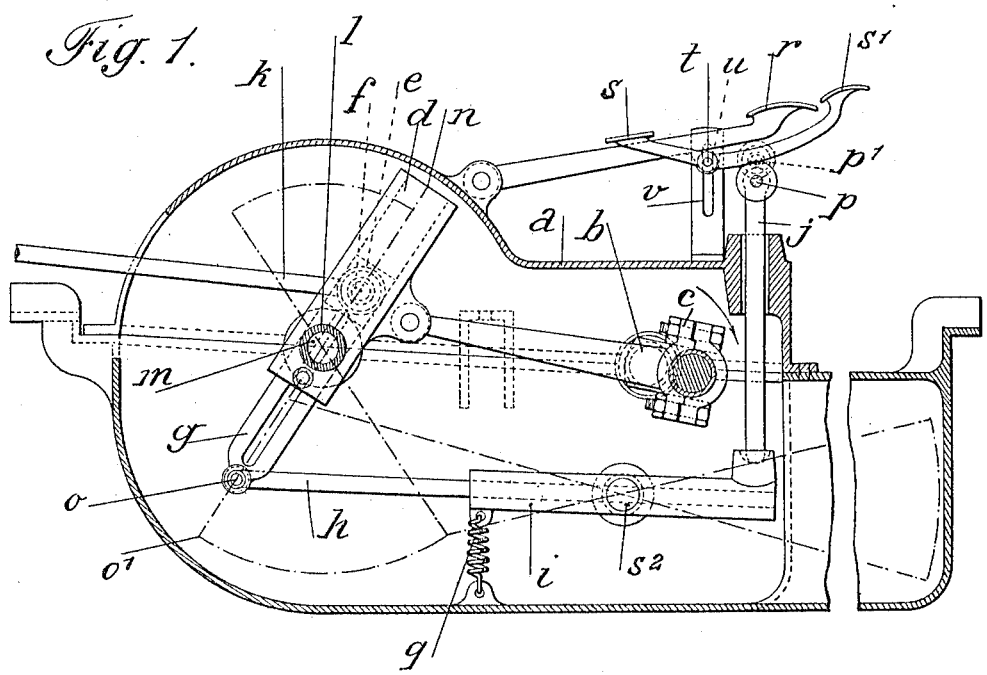
Figure 2:
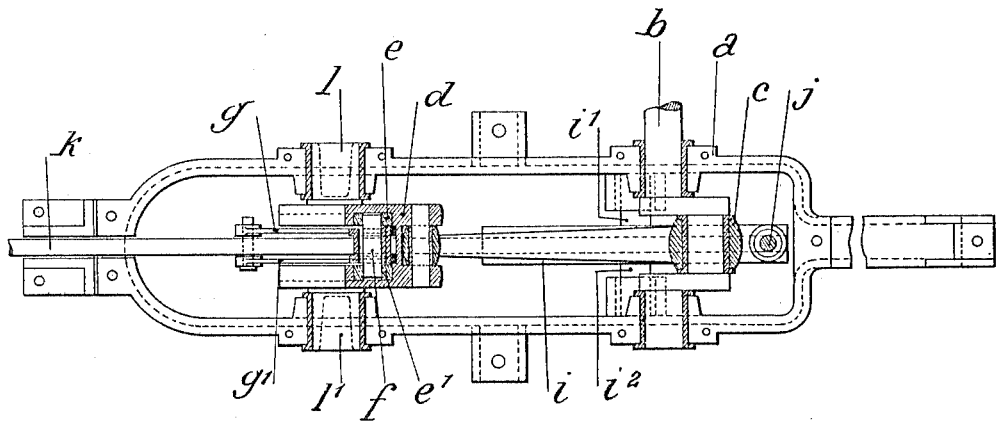

The invention will now be described with reference to the annexed drawings in which:

Figure 1 is a longitudinal section of a form of construction of the new apparatus. Fig. 2 is a horizontal section and Fig. 3 a cross section thereof.

Referring now to the drawing, the main parts forming the device are: a crank casing frame (*a*) in which is journaled the crank shaft (*b*), a crank connecting rod (*c*) connected to the cross head (*d*), two slides (*e*) (*e'*) connected to a common shaft (*f*), two guides (*g*) (*g'*) connected to a cylindrical horizontal rod (*h*) extending through a hollow cylinder (*i*), a cylindrical vertical rod (*j*) and a crank connecting rod (*k*) the head (*k'*) of which is located between both slides (*e*) (*e'*) and through which passes the pin (*f*).

The crank shaft (*b*) rotating in the direction of the arrow is transmitting through the connecting rod (*c*), to the cross head (*d*) pivoted on two pins (*l*) (*l'*) a reciprocating motion at a constant rate. The slides (*e*) (*e'*) may be adjusted in any intermediate position between the pivoting shaft of the cross head and the point (*n*) which is the utmost position which the slides may occupy with reference to the axis (*m*), Fig. 1.

When the axis of the slides register with the oscillation axis, no motion is transmitted to the connecting rod (*k*) and the latter is thus in the inoperative or dead point position, but when the slide axis occupies the position (*n*), the connecting rod (*k*) is reciprocated to the widest extent and at the highest speed. On moving the slides nearer to the axis of oscillation, the reciprocating motion of the connecting rod (*k*) will thus decrease to zero, when their axis (*f*) will then register again with the axis of oscillation (*m*) of the cross head (*d*).

Since the velocity of oscillation of the cross head (*d*) is constant, the connecting rod (*k*) will thus be reciprocated, during equal times, at a more or less higher velocity and to a larger or smaller extent according to whether its head be at a nearer or farther distance from the axis of oscillation. The converting of this reciprocating motion into a continuous rotary motion will be further described with reference to the use of the device in motor vehicles.

The position of the slides and consequently of the head of the connecting rod will be changed in the following manner: Supposing that the axis (*f*) of the slides and connecting rod head is registering with the axis of oscillation (*m*) of the cross head (*d*) and that the same should be brought to the position shown in Fig. 1; the point (*f*) moving to (*m*), the axis (*o*) will be at (*o'*) and (*p*) at (*p'*). By depressing the treadle (*r*) in the direction of the arrow, the slides and connecting rod head will then be brought toward the point (*n*) through the medium of the rod (*j*), the cylinder (*i*) pivoted on the shaft (*i'*) (*i²*), and another rod (*h*) sliding freely in the aforesaid cylinder and the two guides (*g*) (*g'*). The connecting rod head being thus brought to the desired point is now held in the following manner: A double treadle (*s*) (*s'*) is connected to the treadle (*r*) by means of the pin (*t*). Such pin is threaded to the right on part of its length and to the left on the other part. Two jaws, of which one (*u*) is shown in Fig. 1 are screwed on this threaded pin, and are located on either side of a guide (*v*) fixed to the crank casing (*a*). When the slide has been brought to the desired point, by means of the treadle (*r*) it will be sufficient to depress (*s'*) in the direction of the arrow to cause the rotation of the threaded pin (*t*), the rotation of this pin will result in the clamping of the guide (*v*) between both jaws and thus maintaining the connecting rod head at the desired point. For disengaging the latter it will be sufficient to depress (*s*) in the direction of the arrow to cause the pin (*t*) to rotate in the reverse direction and by this motion will cause the jaws to disengage the connecting rod (*i*)

which will then be returned by the spring (*q*) into the registering position with the axis of oscillation of the cross head.

The advantages resulting from the use of this device on motor-vehicles consist in the dispensing with 1°, all friction or metallic engagement, 2°, the changing speed gear casing, 3°, the chain or shaft driving, 4°, the epicycloidal differential gear. The doing away with all these various mechanisms secures the complete stability of the carriage. Further, by means of one treadle only the throwing in and out of gear and all the variations of speed are obtained.

Having now particularly described and ascertained the nature of our invention and in what manner the same is to be performed, we declare that what we claim is:

1. A change speed transmission device comprising in combination, a pivotally mounted transmission member, means oscillating said member about its pivot at a constant speed, a cross head slidable on said member toward and away from the pivot thereof and provided with a connecting rod, and treadle mechanism having a telescoping connection with said member for moving said cross head, said telescoping connection being movable with said member, and a second telescoping connection between said member and the remainder of said treadle mechanism.

2. A change speed mechanism device comprising in combination, a pivotally mounted transmission member, means oscillating said member about its pivot at a constant speed, a cross head slidable on said member toward and away from the pivot thereof and provided with a connecting rod, an element slidable in said member and connected with said cross head, and treadle mechanism including a pivotal member having a telescoping connection with said element.

3. A change speed transmission device comprising in combination, a pivotally mounted transmission member, means oscillating said member, a cross head slidable on said member toward and away from the pivot thereof and provided with a connecting rod, a connecting bar telescoping said member and connected with said cross head to move the same toward and away from said pivot, a hollow pivoted element, a connection slidable in said element and pivoted to said bar, and treadle mechanism for operating said element, substantially as described.

In testimony whereof we affix our signatures.

PAUL ROLANDO.
FRANÇOIS ROLANDO.

In the presence of—
JEAN PIERRE PARET,
LACROIA CLAUDE JOSEPH.

---

Copies of this patent may be obtained for five cents each, by addressing the "Commissioner of Patents, Washington, D. C."